United States Patent
Garcia et al.

(10) Patent No.: US 10,587,342 B2
(45) Date of Patent: Mar. 10, 2020

(54) EMBEDDED OPTICAL RING COMMUNICATION NETWORK FOR AIRCRAFT

(71) Applicant: SAFRAN ELECTRICAL & POWER, Blagnac (FR)

(72) Inventors: Jean-Pierre Garcia, Blagnac (FR); Sebastien Le Gall, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 16/466,605

(22) PCT Filed: Dec. 6, 2017

(86) PCT No.: PCT/FR2017/053419
§ 371 (c)(1),
(2) Date: Jun. 4, 2019

(87) PCT Pub. No.: WO2018/104665
PCT Pub. Date: Jun. 14, 2018

(65) Prior Publication Data
US 2019/0393960 A1  Dec. 26, 2019

(30) Foreign Application Priority Data
Dec. 9, 2016 (FR) ..................................... 16 62226

(51) Int. Cl.
*H04B 10/00* (2013.01)
*H04B 10/2581* (2013.01)
(Continued)

(52) U.S. Cl.
CPC ..... *H04B 10/2581* (2013.01); *H04B 10/2503* (2013.01); *H04B 10/275* (2013.01); *H04J 14/04* (2013.01)

(58) Field of Classification Search
USPC ....................................... 398/86, 59
See application file for complete search history.

(56) References Cited

U.S. PATENT DOCUMENTS

| | | | | |
|---|---|---|---|---|
| 3,840,738 A | * | 10/1974 | Indig ................... | H04B 10/2513 398/146 |
| 4,109,998 A | * | 8/1978 | Iverson ................ | G02B 6/3524 250/208.6 |

(Continued)

OTHER PUBLICATIONS

International Search Report and Written Opinion received for PCT Patent Application No. PCT/FR2017/853419, dated Apr. 5, 2018, 17 pages (8 pages of English Translation and 9 pages of Original Document).

*Primary Examiner* — Agustin Bello
(74) *Attorney, Agent, or Firm* — Womble Bond Dickinson (US) LLP

(57) ABSTRACT

The invention concerns an embedded optical ring communication network (10) suitable for transmitting data between equipment (12a-12h), characterised in that it comprises an assembly of distribution boxes (14a-14h) each connected to two other distribution boxes (14a-14h) by multimode bidirectional optical fibres (16a-16h) so as to form a ring, suitable for also being connected to a multiplexer/demultiplexer (18a, 18b, 18c) by multimode bidirectional optical fibres, and in that each optical fibre (16a-16h) is suitable for transporting optical signals of at least three different modes (32, 32, 34).

5 Claims, 2 Drawing Sheets

Figure 1:
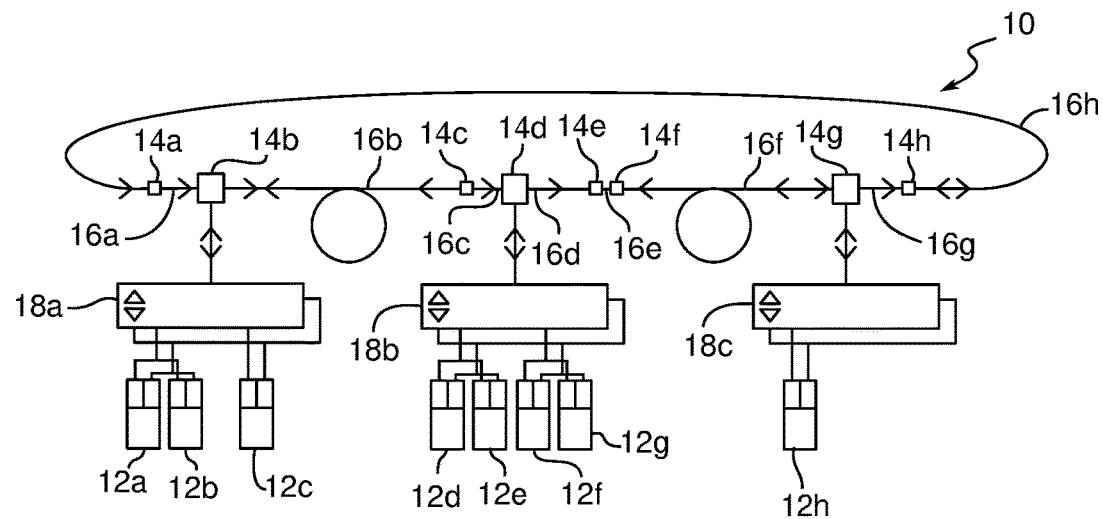

(51) Int. Cl.
  *H04J 14/04* (2006.01)
  *H04B 10/25* (2013.01)
  *H04B 10/275* (2013.01)

(56) References Cited

U.S. PATENT DOCUMENTS

| | | | | |
|---|---|---|---|---|
| 4,278,327 | A * | 7/1981 | McMahon | G02F 1/1326 349/197 |
| 4,366,565 | A | 12/1982 | Herskowitz | |
| 4,431,258 | A * | 2/1984 | Fye | G02B 6/29349 359/589 |
| 4,482,994 | A * | 11/1984 | Ishikawa | G02B 6/2938 385/37 |
| 4,516,837 | A * | 5/1985 | Soref | G02F 1/315 349/196 |
| 4,708,425 | A * | 11/1987 | Gouali | G02B 6/29368 385/24 |
| 5,271,076 | A * | 12/1993 | Ames | G02B 6/32 359/900 |
| 6,014,244 | A * | 1/2000 | Chang | G02B 6/2746 359/281 |
| 6,198,857 | B1 * | 3/2001 | Grasis | G02B 6/29367 385/24 |
| 6,253,007 | B1 * | 6/2001 | Laughlin | G02B 6/266 385/33 |
| 6,363,186 | B1 * | 3/2002 | Popelek | G02B 6/29362 385/18 |
| 6,597,829 | B2 * | 7/2003 | Cormack | G02B 6/3524 385/15 |
| 6,888,971 | B2 * | 5/2005 | Li | G02F 1/093 359/484.05 |
| 6,941,072 | B2 * | 9/2005 | Wu | G02B 6/29367 398/83 |
| 7,058,257 | B2 * | 6/2006 | Pan | G02B 6/29367 385/24 |
| 7,120,361 | B2 * | 10/2006 | Tei | G02B 6/29367 398/85 |
| 7,305,155 | B2 * | 12/2007 | Oya | B82Y 20/00 385/14 |
| 7,403,677 | B1 * | 7/2008 | Zhao | G02B 6/32 359/245 |
| 7,415,210 | B2 * | 8/2008 | Gurevich | H04B 10/40 398/83 |
| 7,440,654 | B2 * | 10/2008 | Kirk | G02B 1/005 385/37 |
| 7,574,078 | B2 * | 8/2009 | Wagener | H04Q 11/0005 385/16 |
| 7,596,318 | B2 * | 9/2009 | Han | B82Y 10/00 398/69 |
| 7,603,006 | B2 * | 10/2009 | Cai | G02B 6/3528 385/16 |
| 7,805,033 | B2 * | 9/2010 | Pitwon | G02B 6/12011 385/24 |
| 7,843,644 | B1 * | 11/2010 | Wang | G02B 6/262 359/641 |
| 8,007,965 | B2 * | 8/2011 | Pitwon | G02B 6/12011 430/321 |
| 8,417,075 | B2 * | 4/2013 | Violante | G02B 6/3604 385/26 |
| 8,515,278 | B2 * | 8/2013 | Cheng | G02B 6/12004 385/96 |
| 8,520,990 | B2 * | 8/2013 | Lewis | G02B 6/32 385/35 |
| 8,538,266 | B2 * | 9/2013 | Lin | G02B 6/2817 398/82 |
| 9,118,434 | B2 * | 8/2015 | Shinada | H04J 14/02 |
| 9,401,773 | B1 * | 7/2016 | Gui | H04J 14/02 |
| 9,551,833 | B1 * | 1/2017 | Li | H04J 14/02 |
| 9,594,216 | B1 * | 3/2017 | Wang | G02B 6/3616 |
| 9,703,042 | B2 * | 7/2017 | Mossberg | G02B 6/2938 |
| 10,313,045 | B2 * | 6/2019 | Xiao | H04J 14/02 |
| 2002/0057868 | A1 * | 5/2002 | Wu | G02B 6/29367 385/24 |
| 2002/0122613 | A1 * | 9/2002 | Kittaka | B82Y 20/00 385/14 |
| 2003/0063844 | A1 * | 4/2003 | Caracci | G02B 6/29362 385/24 |
| 2003/0063884 | A1 * | 4/2003 | Smith | G02B 6/032 385/129 |
| 2003/0076559 | A1 * | 4/2003 | Richard | G01B 11/27 398/75 |
| 2003/0077029 | A1 * | 4/2003 | Basu | G02B 6/29307 385/24 |
| 2003/0118273 | A1 * | 6/2003 | Richard | G01B 11/27 385/16 |
| 2003/0123802 | A1 * | 7/2003 | Richard | G01B 11/27 385/47 |
| 2004/0005115 | A1 * | 1/2004 | Luo | G02B 6/29367 385/24 |
| 2004/0165828 | A1 * | 8/2004 | Capewell | G02B 6/29367 385/47 |
| 2005/0036735 | A1 * | 2/2005 | Oosterhuis | G02B 6/3604 385/26 |
| 2005/0259917 | A1 * | 11/2005 | Afonso | G02B 5/20 385/31 |
| 2005/0271322 | A1 * | 12/2005 | Oya | B82Y 20/00 385/24 |
| 2006/0210270 | A1 * | 9/2006 | Han | B82Y 10/00 398/48 |
| 2007/0127869 | A1 * | 6/2007 | Kirk | G02B 1/005 385/37 |
| 2008/0107417 | A1 * | 5/2008 | Pitwon | G02B 6/12011 398/82 |
| 2008/0317407 | A1 * | 12/2008 | Popp | G02B 6/3604 385/26 |
| 2009/0180736 | A1 * | 7/2009 | Levner | G02B 6/02085 385/37 |
| 2010/0129078 | A1 * | 5/2010 | Weston-Dawkes | H04J 14/0212 398/79 |
| 2010/0266294 | A1 * | 10/2010 | Popp | G02B 6/3604 398/200 |
| 2010/0290737 | A1 * | 11/2010 | Pitwon | G02B 6/12011 385/24 |
| 2010/0329678 | A1 * | 12/2010 | Wang | G02B 6/29367 398/79 |
| 2013/0216180 | A1 * | 8/2013 | Tan | G02B 6/29367 385/24 |
| 2013/0294776 | A1 * | 11/2013 | Cheng | G02B 6/12004 398/67 |
| 2013/0330080 | A1 * | 12/2013 | Li | H04J 14/02 398/79 |
| 2014/0071531 | A1 * | 3/2014 | Matiss | G02B 27/283 359/489.09 |
| 2014/0147079 | A1 * | 5/2014 | Doerr | G02B 6/262 385/37 |
| 2014/0226934 | A1 * | 8/2014 | Panotopoulos | G02B 6/4231 385/48 |
| 2014/0294386 | A1 * | 10/2014 | Shinada | H04J 14/02 398/65 |
| 2015/0063807 | A1 * | 3/2015 | Simonneau | H04B 10/25 398/59 |
| 2015/0180584 | A1 * | 6/2015 | Mossberg | G02B 6/2938 398/79 |
| 2015/0280826 | A1 * | 10/2015 | Effenberger | H04B 10/2581 398/66 |
| 2017/0017038 | A1 * | 1/2017 | Mossberg | G02B 6/2938 |
| 2017/0254958 | A1 * | 9/2017 | Yue | G02B 6/327 |
| 2018/0017735 | A1 * | 1/2018 | Miao | G02B 6/29365 |
| 2018/0139520 | A1 * | 5/2018 | Xiao | G02B 6/2938 |
| 2018/0220208 | A1 * | 8/2018 | Gui | H04Q 11/0005 |

* cited by examiner

EMBEDDED OPTICAL RING COMMUNICATION NETWORK FOR AIRCRAFT

1. TECHNICAL FIELD OF THE INVENTION

The invention concerns an embedded optical network of the ring network type. In particular, the invention concerns an optical communication network which can be embedded in an aircraft in order to allow aircraft equipment communicating together.

2. TECHNOLOGICAL BACKGROUND

In order to connect equipment of an aircraft together for communication purposes, the aircraft are equipped with different cabling forming a network, whose installation and maintenance can be complex. Furthermore, this cabling presents a high cost, on the one hand, in terms of cable prices, but also in terms of weight, leading to an increase in fuel consumption during the flight.

In addition, the current networks generally use copper cables forming a star and ring network mixture, of the AFDX "Switched Ethernet" type. The cables use a copper support of two twisted and redundant pairs.

This type of copper cable network has several disadvantages: the metal cables cause problems of electromagnetic disturbances (electromagnetic compatibility, current induction, etc.), the network is hardly adaptable to the modifications (adding new equipment, for example), the network has a flow limited to a few tens of Mb/sec (mainly due to the determining aspect of the TCP protocol), and the weight of the cables is significant (around 32 kg/km, an aeroplane can comprise, for example, several hundred kilometres of cables). To all these disadvantages is furthermore added a high maintenance and modification cost.

A solution proposed to at least some of these disadvantages has been to replace the copper cables with optical fibers. However, the obtained network r does not provide for a great adaptability.

3. AIMS OF THE INVENTION

The invention aims to overcome at least some of the disadvantages of known communication networks.

In particular, the invention aims to provide, in at least one embodiment of the invention, a communication network allowing to improve communications between equipment of an aircraft.

The invention also aims to provide, in at least one embodiment, a communication network allowing to increase the flow of data exchanges.

The invention also aims to provide, in at least one embodiment of the invention, a communication network allowing the easy connection or disconnection of equipment.

The invention also aims to provide, in at least one embodiment of the invention, a communication network offering improved data transmissions security.

The invention also aims to provide, in at least one embodiment of the invention, a communication network allowing a redundancy in case of degradation of a portion of the network.

4. SUMMARY OF THE INVENTION

For this purpose, the invention concerns an embedded optical ring communication network, suitable to enable a transmission of data between equipment, characterised in that:

- the optical network comprises an assembly of distribution boxes each connected, on the one hand, directly to two other distribution boxes by multimode and bidirectional optical fibers so as to form a ring, and suitable for being connected, on the other hand, to at least one multiplexer/demultiplexer by multimode and bidirectional optical fibers,
- each optical fiber is suitable to enable the transport of optical signals of at least three different modes,
- each multiplexer/demultiplexer comprises a plurality of passive optical elements and enables to transmit at least three equipment signals coming from the equipment via a modal multiplexing in an optical fiber or to separate the modes of an optical signal coming from the optical fibers into at least three equipment signals,
- the distribution boxes each comprise three separators, to which are connected the optical fibers and each directed towards at least a prism, said separators and said prism being configured to direct an optical signal coming from an optical fiber and entering into a separator towards the two other separators and so that each separator receives the optical signals coming from the two other separators and sends these signals to the optical fiber to which it is connected.

An optical communication network according to the invention therefore allows a communication between different equipment at an increased flow (up to several tens of Gb/second over more than one hundred metres): the multiplexing by propagation modes allows being added to the multiplexing commonly used (in particular, wavelength multiplexing and time multiplexing) in so order to increase the number of equipment which can communicate simultaneously over the network. Furthermore, multiplexing by mode allows, by controlling injection and propagation of the modes of the optical signals, to avoid the modal dispersion.

The separators and the prism of the distribution boxes are passive components, which allow transmitting optical signals without losing the modes of the optical signal transmitted. The separators allow forming, from an optical signal received, and thanks to the passive optical elements, two identical optical signals which are directed to the different portions of the prism. By reflection or refraction, the prism directs a first of these two optical signals towards a first of the other separators and a second of these two signals to a second separator. Likewise, by inverse functioning, each separator receives two optical signals coming from the two other separators, thus allowing a bidirectional functioning of the transmission between each separator, two-by-two.

The passive functioning of the distribution boxes also allows them to function without the presence of a multiplexer/demultiplexer connected to one of the separators. In this case, the distribution box behaves like a socket in the network, transmitting the optical signals from a nearby distribution box to the following distribution box in the ring, and available to be able to connect new equipment to the network. Thus, the distribution boxes can be distributed in the infrastructure, wherein the network is deployed, for example an aircraft, for new equipment to be added in the future. Likewise, when an item of equipment or a set of equipment must be removed from the network, the associated multiplexer/demultiplexer can be disconnected from the distribution box, without requiring reconfiguration of the network for the correct functioning thereof.

Multiplexing by mode also allows improving the security of the data transmission, as the operation of separating the modes (demultiplexing) can be carried out only by modal demultiplexers: an interception of data at the level of the optical fibers, for example by stripping and curving this optical fiber, will not allow obtaining a readable optical signal.

Furthermore, due to the configuration of the ring network and due to the fact that each optical fiber enables the transmission of optical signals in the two directions (bidirectional fiber), the optical network presents a redundancy making it possible, in case of the network failing, for all equipment to remain connected.

Finally, a communication network according to the invention allows transmitting in a same multiplexed optical channel, independent and segregated information according to its criticality or its types in an optical (or modal) way, without interference from an optical mode to another.

Advantageously and according to the invention, the prism is a straight prism having an equilateral triangle as base.

According to this aspect of the invention, the separator directs a first optical signal towards a first side face (rectangular) of the prism. By reflection on this face, this first optical signal is directed towards a first of the other separators. Likewise, the separator directs a second optical signal towards a second side face of the prism and, by reflection on this face, this second optical signal is directed towards a second of the other separators. The prism thus acts as a multifaceted mirror. The angles of incidence and the refraction index of the prism are configured to allow these reflections possible.

Advantageously, and according to the invention, the multimode optical fibers have a core diameter greater than 50 μm.

According to this aspect of the invention, the multimode fiber has a sufficiently high core diameter to allow the propagation of the signals of different modes in the fiber.

Advantageously, and according to the invention, the distribution boxes and the optical fibers forming the ring are arranged in a same plane, and the optical network comprises a sensor enabling to measure the propagation time of two optical signals in the ring, the two optical signals traveling the ring in an opposite propagation direction.

According to this aspect of the invention, the optical ring network allows forming a Sagnac effect gyrometer, allowing to measure the angular speed of a transport means wherein the optical network is embedded, according to the plane wherein extend the distribution boxes and the optical fibers forming the ring. This aspect of the invention is particularly useful in an aircraft, and depending on the configuration of the ring, allows measuring the angular speed according to the plane wherein extends the ring (for example, measuring the roll, pitch or yaw of the aircraft).

The invention also concerns an aircraft comprising a plurality of equipment, characterised in that it comprises an optical network according to the invention for the transmission of data between said equipment.

The equipment of the aircraft can thus transmit data via the optical network, even if it emits the signals at the same wavelengths.

The invention also concerns an optical communication network and an aircraft characterised in combination by all or some of the characteristics mentioned above or below.

5. LIST OF FIGURES

Figure 2:
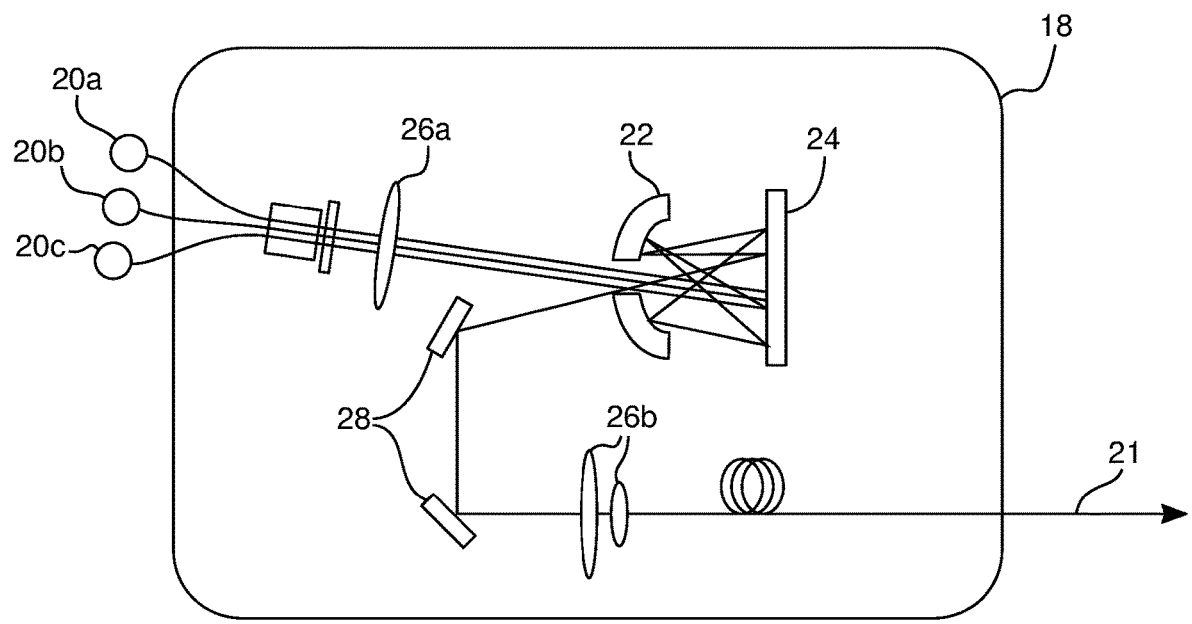
Figure 3:
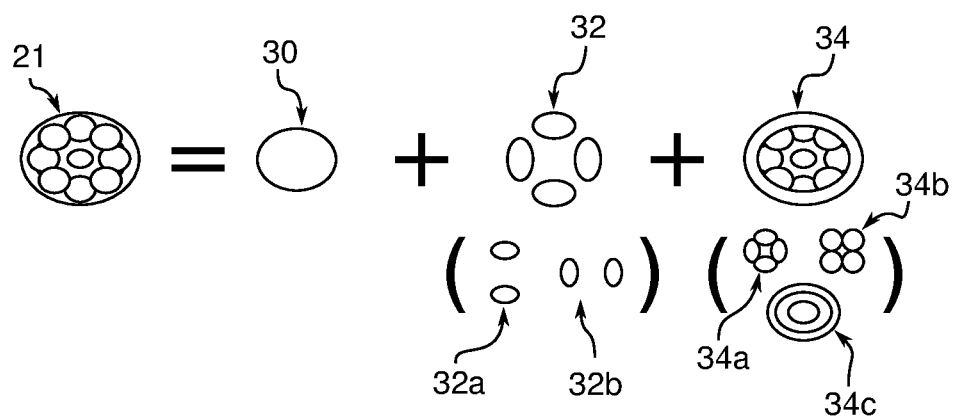
Figure 4:
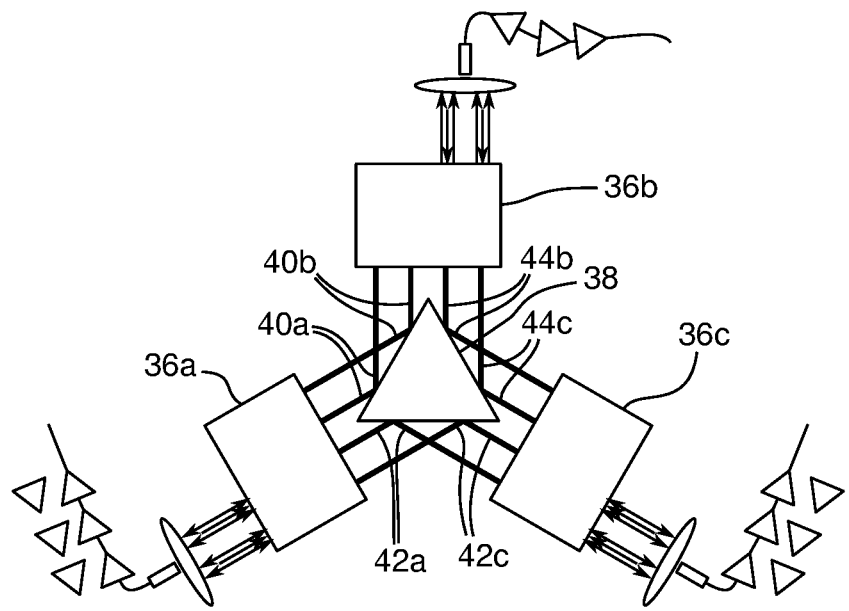

Other aims, characteristics and advantages of the invention will appear upon reading the following description, given only as a non-limiting example and which refers to the appended figures, wherein:

FIG. 1 is a schematic view of an optical communication network according to an embodiment of the invention, FIG. 2 is a schematic view of a multiplexer of an optical communication network according to an embodiment of the invention, FIG. 3 is a schematic view of different modes which can be transported in one same multimode optical fiber of an optical communication network according to an embodiment of the invention, FIG. 4 is a schematic view of a distribution box of an optical communication network according to an embodiment of the invention.

6. DETAILED DESCRIPTION OF AN EMBODIMENT OF THE INVENTION

The following embodiments are examples. Although the description refers to one or more embodiments, this does not necessarily mean that each reference concerns the same embodiment, or that the characteristics are only applied to one single embodiment. Single characteristics of different embodiments can also be combined to provide other embodiments. In the so figures, the scales and proportions are not strictly respected for purposes of illustration and clarity.

FIG. 1 schematically represents an optical ring communication network 10 according to an embodiment of the invention, embedded for example in an aircraft. The optical network 10 is intended to enable the transmission of computerised data between equipment 12a-12h. For this purpose, the communication network comprises an assembly of distribution boxes 14a-14h, each connected directly to two other distribution boxes by multimode and bidirectional optical fibers 16a-16h so as to form a ring. As visible in particular by the loops formed by the optical fibers 16e and 16h allowing to represent a large fiber length, FIG. 1 is not to scale and the distribution boxes can be farther away from one another and distributed differently over the ring.

Each distribution box is furthermore suitable for being connected to a multiplexer/demultiplexer by a multimode and bidirectional optical fiber. In normal configuration of the network, each distribution box can be or not be connected to a multiplexer/demultiplexer: the distribution boxes connected to a multiplexer/demultiplexer, here the distribution boxes 14b, 14d, 14g, allow the connection to the optical network of the equipment connected to the multiplexer/demultiplexer, and the distribution boxes not connected to a multiplexer/demultiplexer allow proposing a connection socket in case the adding of equipment to the network via a multiplexer/demultiplexer is required. In practice, the distribution boxes can thus be distributed in the aircraft in prevision of new equipment to be added in the future.

In this embodiment, the distribution box 14b is connected to a multiplexer/demultiplexer 18a allowing the connection of the equipment 12a, 12b, 12c to the network, the distribution box 14d is connected to a multiplexer/demultiplexer 18b allowing the connection of the equipment 12d, 12e, 12f, 12g to the network, and the distribution box 14g is connected to a multiplexer/demultiplexer 18c, allowing the connection of the equipment 12h to the network.

By measuring the difference of the propagation time in the ring of an optical signal propagating in the multimode optical fibers 16a-16h during a so complete rotation of the ring in one direction and in the inverse direction, the optical network 10 can allow to measure the angular speed of the aircraft in the plane wherein the ring extends.

FIG. 2 schematically represents a multiplexer/demultiplexer 18 of an optical network according to an embodiment of the invention.

The functioning of the multiplexer/demultiplexer 18 is explained here in its functioning as a multiplexer. The demultiplexer function is similar in the inverse direction.

The multiplexer/demultiplexer 18 receives optical signals coming from the equipment and intended to be transmitted to the optical network, here three equipment signals 20a, 20b, 20c, which can have an equal or different frequency. If the equipment does not transmit optical signals, but for example, electrical signals, the multiplexer/demultiplexer can comprise means for converting electrical signals into optical signals. By the passage of the three equipment signals 20a, 20b, 20c in a plurality of passive optical elements, the equipment signals will be combined to form one single optical signal 21 wherein each equipment signal has been modulated so as to present a specific propagation mode. The multiplexer/demultiplexer 18, to do this, produces a succession of several optical Fourier transforms via the passive optical elements, for example in this embodiment, a mirror 22 and a phase network 24, the equipment signals producing several reflections between the phase network 24 and the mirror 22 until segregation by mode and combination. The passive optical elements also comprise a collimation lens 26a and focal lenses 26b, as well as deflector mirrors 28.

As explained above, the demultiplexer function operates in the inverse direction, i.e. one single optical signal enters into the multiplexer/demultiplexer 18 and is broken down into several output signals transmitted to each item of equipment, by using the same components. The segregation of the signals by mode from this multiplexing is described in FIG. 3.

FIG. 3 schematically represents the different modes which can be transported in one same multimode optical fiber of an optical communication network according to an embodiment of the invention.

The reference 21 represents the shape of the optical signal such as propagated in a multimode optical fiber according to a transversal cross-section of said fiber. The optical signal 21, for example, during the combination of three signals 20a, 20b, 20c, such as described above, can be considered as the sum of the three modes used to propagate these equipment signals in the single optical signal. In this embodiment, the first mode 30 is a $TEM_{00}$ type mode, the second mode 32 is a $TEM_{02}$ type mode (or a combination of two modes 32a and 32b of $TEM_{01}$ type), the third mode 34 is a $TEM_{02}$ mode (or a combination of three modes 34a, 34b and 34c of $TEM_{02}$ type). The reference 21 thus represents the sum of the groups of modes 30, 32 and 34, themselves composed of modes 30, 32a and 32b, 34a and 34b and 34c.

The embodiment of the invention described is only provided by way of indication as a solution for combining three equipment signals. According to other embodiments, more modes can be used to allow combining more than three equipment signals, according to the needs of the network and the number of items of equipment connected. Furthermore, the types of modes used can be different.

FIG. 4 schematically represents a distribution box of an optical communication network according to an embodiment of the invention.

The distribution box comprises three separators, a first separator 36a, a second separator 36b and a third separator 36c, as well as a straight prism 38 having an equilateral triangle as base. Each separator 36a, 36b, 36c is connected to a multimode optical fiber, and receives an optical signal coming from either another nearby distribution box in the ring, or a multiplexer/demultiplexer. In the embodiment illustrated, the separators 36a, 36b receive, for example, optical signals coming from other distribution boxes and the separator 36b can receive an optical signal coming from a multiplexer/demultiplexer.

The separators allow splitting the optical signals to transmit them to the two other separators, as well as to receive the optical signals coming from the two other separators. For this purpose, the first separator 36a splits, for example, the signal received into two identical optical signals, forming optical beams, a first optical beam 40a and a second optical beam 42a. The first optical beam 40a is directed towards a face of the prism and is reflected towards the second separator 36b. The second optical beam 42a is directed towards a face of the prism 38 and is reflected towards the third separator 36c.

Inversely, the first separator receives an optical beam 40b coming from the second separator 36b and reflected by the prism 38 and an optical beam 42c coming from the third separator 36c and reflected by the prism 38. Finally, the second separator 36b sends an optical beam 44b towards the third separator 36c and receives an optical beam 44c from the third separator 36c.

In the case where the second separator 36b is not connected to a multiplexer/demultiplexer (the distribution box is thus available to connect new equipment), the separators can be configured such that the first separator 36a and the third separator 36c send/receive only the optical beams 42a and 42c.

Upon receiving the optical beams coming from the other separators, each separator combines these optical beams and transmits the optical signal obtained towards the optical fiber to which it is connected.

The invention is not limited to the single embodiments described. In particular, other types of optical networks are possible. For example, the configurations of the passive optical elements of the multiplexers/demultiplexers, as well as the distribution boxes can be modified from the time that the function produced is identical and that only the passive optical elements are used, as they allow conserving the modes of the optical signals.

The invention claimed is:

1. Embedded optical ring communication network suitable to enable a transmission of data between equipment, characterised in that:

the optical network comprises an assembly of distribution boxes each connected, on the one hand, directly to two other distribution boxes by multimode and bidirectional optical fibers so as to form a ring, and suitable for being connected, on the other hand, to at least one multiplexer/demultiplexer by multimode and bidirectional optical fibers, each optical fiber is suitable to enable the transport of optical signals of at least three different modes, each multiplexer/demultiplexer comprises a plurality of passive optical elements and enables to transmit at least three equipment signals coming from the equipment via a modal multiplexing in an optical fiber or to separate the modes of an optical signal coming from the optical fibers towards at least three equipment signals, the distribution boxes each comprise three separators, to which are connected the optical fibers and each directed towards at least a prism, said separators and said prism being configured to direct an optical signal coming from an optical fiber and entering into a separator towards the two other separators and so that each separator receives the optical signals coming from the two other separators and sends these signals to the optical fiber to which it is connected.

2. Optical network according to claim 1, wherein the prism is a straight prism having an equilateral triangle as base.

3. Optical network according to claim 1, wherein the multimode optical fibers have a core diameter greater than 50 µm.

4. Optical network according to claim 1, wherein the distribution boxes and the optical fibers forming the ring are arranged in a same plane, and in that the optical network comprises a sensor enabling to measure the propagation time of two optical signals in the ring, the two optical signals traveling the ring in an opposite propagation direction.

5. Aircraft comprising a plurality of equipment, wherein it comprises an optical network according to claim 1, for the transmission of data between said equipment.

* * * * *